(12) United States Patent
Behrendt et al.

(10) Patent No.: US 8,127,271 B2
(45) Date of Patent: Feb. 28, 2012

(54) METHOD AND SYSTEM FOR ACCESSING A RESOURCE IMPLEMENTED IN A COMPUTER NETWORK

(75) Inventors: Michael M Behrendt, Randersacker (DE); Martin Henke, Reutlingen (DE); Dietmar Kuebler, Altdorf (DE); Georg Ochs, Moetzingen (DE)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 12/034,982

(22) Filed: Feb. 21, 2008

(65) Prior Publication Data

US 2008/0216050 A1    Sep. 4, 2008

(30) Foreign Application Priority Data

Mar. 2, 2007  (DE) .................. 07103381.5

(51) Int. Cl.
    *G06F 9/44*    (2006.01)
(52) U.S. Cl. ........ 717/104; 717/103; 717/111; 717/118; 709/217
(58) Field of Classification Search .................. None
    See application file for complete search history.

(56) References Cited

U.S. PATENT DOCUMENTS

| | | | | |
|---|---|---|---|---|
| 5,596,702 A * | 1/1997 | Stucka et al. | ................. | 715/746 |
| 5,740,422 A * | 4/1998 | Foltz et al. | .................... | 709/229 |
| 5,771,388 A * | 6/1998 | Mondrik et al. | .............. | 710/262 |
| 5,974,256 A * | 10/1999 | Matthews et al. | ............. | 717/141 |
| 6,584,612 B1 * | 6/2003 | Mueller et al. | ................ | 717/166 |
| 6,631,403 B1 * | 10/2003 | Deutsch et al. | ............... | 709/217 |
| 6,662,357 B1 * | 12/2003 | Bowman-Amuah | .......... | 717/120 |
| 7,069,234 B1 * | 6/2006 | Cornelius et al. | ............... | 705/80 |
| 7,185,333 B1 * | 2/2007 | Shafron | ........................ | 717/173 |
| 7,774,373 B2 * | 8/2010 | Yu et al. | ........................ | 707/798 |
| 2005/0091192 A1 * | 4/2005 | Probert et al. | .................... | 707/1 |
| 2005/0091655 A1 * | 4/2005 | Probert et al. | ................. | 718/100 |
| 2006/0026552 A1 * | 2/2006 | Mazzitelli et al. | ............ | 717/101 |
| 2007/0016557 A1 * | 1/2007 | Moore et al. | ....................... | 707/3 |
| 2007/0271557 A1 * | 11/2007 | Geisinger | ..................... | 717/163 |
| 2008/0028401 A1 * | 1/2008 | Geisinger | ........................ | 718/1 |
| 2008/0133910 A1 * | 6/2008 | Birk et al. | ....................... | 713/167 |
| 2009/0307308 A1 * | 12/2009 | Siegemund et al. | .......... | 709/203 |

OTHER PUBLICATIONS

Title: Runtime Deployment Adaptation for Resource Constrained Devices, author: Hens et al, source: IEEE, dated: Jul. 15, 2007.*
Title: A Reflective Runtime Environment for Dynamic Adaptation of Streaming Media on Resource Constrained Devices, author: Khan, M.A et al , Jan. 3, 2005.*

* cited by examiner

*Primary Examiner* — Chameli Das
(74) *Attorney, Agent, or Firm* — Matthew C. Zehrer

(57) ABSTRACT

The present invention relates to method and system for accessing a resource implemented in a computer network, wherein a plurality of different runtime environments exist used by either one of the resources or by a systems management application accessing one of the resources, wherein the different runtime environments require the usage of a web service resource framework comprising a plurality of respective different, runtime-specific web service standards.

8 Claims, 6 Drawing Sheets

WSDM Standard Container
including WS-* implementations

INVENTIONAL

INVENTIONAL FIG. 2

WSDM Standard Container
including WS-* implementations

INVENTIONAL

WSDM Standard Container:
Mediation scenario

METHOD AND SYSTEM FOR ACCESSING A RESOURCE IMPLEMENTED IN A COMPUTER NETWORK

This application claims benefit of priority based on Germany Patent Application No. 07103381.5, filed on Mar. 2, 2007.

FIELD OF THE INVENTION

The present invention relates to the field of systems management. In particular, it relates to a method and system for accessing a resource implemented in a computer network, wherein a plurality of different runtime environments exist used by either one of the resources or by a systems management application accessing one of the resources, wherein the different runtime environments require the usage of a web service resource framework comprising a plurality of respective different, runtime-specific web service standards.

SUMMARY

Web services (WS) standards such as WSDM (Web Services Distributed Management) and WS-Man (Web Service Management) and future converged standards describe how IT resources (operating systems, printers, applications, etc.) expose their manageability capabilities using web services to client applications. These client applications typically are systems management applications provided by IBM, or by Internet Service Providers or other vendors. Prior art web services describe their interfaces in XML documents following the WSDL (Web Service Definition Language) standard. They are accompanied by implementations of the respective web services typically being deployed and executed on application servers.

So, there are open standards describing the interfaces of the capabilities using WSDL definitions, but the realization of the WS-implementations vary depending on the runtime environment (WAS (WebSphere Application Server), OSGI (Open Services Gateway Initiative), Apache Tomcat, etc.) they are deployed to.

It should be noted that the present invention applies to all standards in this field. Currently WSDM (Web Services Distributed Management) (standardized at OASIS (Organization for the Advancement of Structured Information Standards)) and WS-Management (WS-Man) (standardized at the DMTF (Distributed Management Task Force)) represent the current prior-art standard. Both the group behind WSDM and behind WS-Man have agreed upon to join these standards to a new one, which will be defined over the next few years. So, WSDM constructs such as manageable resources should be understood to be used interchangeably to the corresponding WS-Man construct.

With reference to FIG. 1 illustrating the most basic structural components of a prior art hardware and software environment used for a prior art web based systems management method, one of the latest dated prior art web serviced based systems management implementation is a WSDM client, which targets for a specific runtime environment 8A to 8E, such as AIDE (Autonomic Integrated Development Environment) on Apache Tomcat, etc.

The WSDM Manageability Interface 4 is an interface expressed through a WSDL 1.1 document providing the definition of the services interface, associated resource property scheme and resource meta-data document.

Each of these implementations defines its own programming model 5, 6, 7 for a resource type. Such programming models 5, 6, 7 define how respective manageable resources must be implemented for being able to run within the respective runtime environment.

Various disadvantages are within the current implementations as represented in FIG. 1 by a cooperation of elements 1, 4, 5, 8E:

First, they are not portable and there is no flexibility with respect to decisions on deployment targets. This is due to the fact that each manageable resource runtime environment defines its own programming model.

Second, the different runtime environments 8A . . . 8E implement different respective levels of completeness of the WS specifications required for WSDM manageable resources as well as for a WS-Resource Transfer in case of the above mentioned WS-Man standard. This is expressed by the different heights of boxes 5, 6, 7.

In addition for the implemented specifications respective different quality-of-service attributes are supported, such as performance, reliability, etc. Since each of the currently available runtime environments 8A . . . 8E for manageable resources supports different qualities of service based on different programming models, it is not possible for providers of manageable resource implementations to rely on a common, standardized set of features provided by the underlying runtime environment. For example, the runtime environment 8E denoted "WAS"—Websphere Application Server—implements an attribute which is not implemented by the runtime environment. As one example the environment 8E implements End-to-End WS-Security functionality which is not provided by 8A-8D.

Another example where each runtime supports different levels and qualities of services is the support of WS-Addressing.

WS-Addressing exists in multiple different versions. Each runtime environment has chosen a version which was available during development and test of the runtime. It is also the freedom of the runtime provider which APIs he provides to expose the functionality of WS-Addressing and the level of interoperability. So e.g., WAS 6 has chosen version 2004/08 where WAS 6.1 has a 2006 Version of WS-Addressing. Another example is that from WAS 6 to WAS 6.1 the API which exposes the WS-Addressing functionality has significantly changed. So moving a WSDM compliant web service from WAS 6 to WAS 6.1 involves a significant amount of porting effort.

In this context, the discussion is not about the "low-level" programming model (i.e., J2EE vs. OSGI) and its corresponding implementation (e.g., IBM WebSphere Application Server, JBOSS (JBoss Application Server), Bea WebLogic, Apache Geronimo, etc.). It is more about the programming model required by a "container" being implemented on top of J2EE/OSGi, so that manageable resources can run within it. Such a container would overcome prior-art shortcomings such as interoperability between different runtimes.

An embodiment of the present invention is to provide a method for accessing a resource transparently from a client perspective, i.e., make the access method independent of the underlying runtime environment.

In another embodiment the present invention provides an interface layer between the WSDM manageability interface and the different respective runtime environments, which mitigates the implementational differences of the respective runtime environments. This interface layer provides a commonly usable programming model for each resource type and provides an adaptation mechanism between the generic programming model and a respective individual runtime environment.

According to another embodiment of the invention a method for accessing resources implemented in a computer network is disclosed, wherein a plurality of different runtime environments exist used by either one of the resources or by a systems management application accessing one of the resources, wherein the different runtime environments require the usage of a web service resource framework comprising a plurality of respective different, runtime-specific web service standards such as WSDM, WSMAN required to be used for different respective objectives—for example web service addressing, web service notification, web service security-, wherein this method is characterised by the steps of:

using a generic resource programming model of a resource defining:

access modalities required for accessing the different resources and a minimum specification of functionalities and attributes associated with a resource,—e.g., the functionality of sending a notification to a resource, or that of requesting the address of a specific resource instance, or the functionality of addressing a specific resource property, etc., using an adaptation mechanism comprising a plurality of "deltas of code functionality"—which is basically the missing functionality not being part of the target runtime environment—for adapting the generic resource programming model to a respective plurality of runtime-specific resource models comprising respective different, resource functionalities and respective different access modalities specific for a respective plurality of the different runtime environments, and accessing the resource in its specific runtime environment by using a request comprising the respective delta of code functionality specific for the runtime environment of the resource.

The resource programming model is herein to be understood as the basic programming for implementing a resource. This includes the exploitation of APIs provided by the underlying runtime infrastructure or libraries provided by third-party vendors.

Access modalities are herein to be understood as the sum of information needed to access resources. This includes the structure of the message addressing the resource, the way how the identification of the resource is expressed, the security information to be passed for accessing the resource and all other contextual information needed to address the resource.

The minimum specification of functionalities and attributes associated with a resource is herein to be understood as the set of functionalities and attributes to be provided by the resource. For example, this could include information required for identifying the resource and having read-access to its properties.

This method is suited to access any type of resource be that a server-, storage-, or network type resource.

In WSDM language, this interface layer is implemented in a standard container. A Java standard container is provided by another embodiment of present invention in order to implement WSDM manageable resources and corresponding WS-Man constructs. Such container may be implemented on top of the different runtime environment depicted at the bottom of FIG. 1.

In another embodiment, the inventional method advantageously hides the implementation details of the underlying runtime environment, which has the advantageous effect of significantly increasing the flexibility of the deployment options for implementers of WSDM manageable resources.

Further, the development of web services based on WSDM can be significantly accelerated even in situations in which third party developers contribute to an in-house web services development.

In another embodiment, the inventional method may be applied to all actually existing runtime environments, such as: IBM Websphere Application Server, Apache Tomcat, ".net" technology, OSGI, JBOSS, BEA WebLogic, or any other type of J2EE Application server.

BRIEF DESCRIPTION OF THE DRAWINGS

The present invention is illustrated by way of example and is not limited by the shape of the figures of the drawings in which.

DETAILED DESCRIPTION

Figure 1:
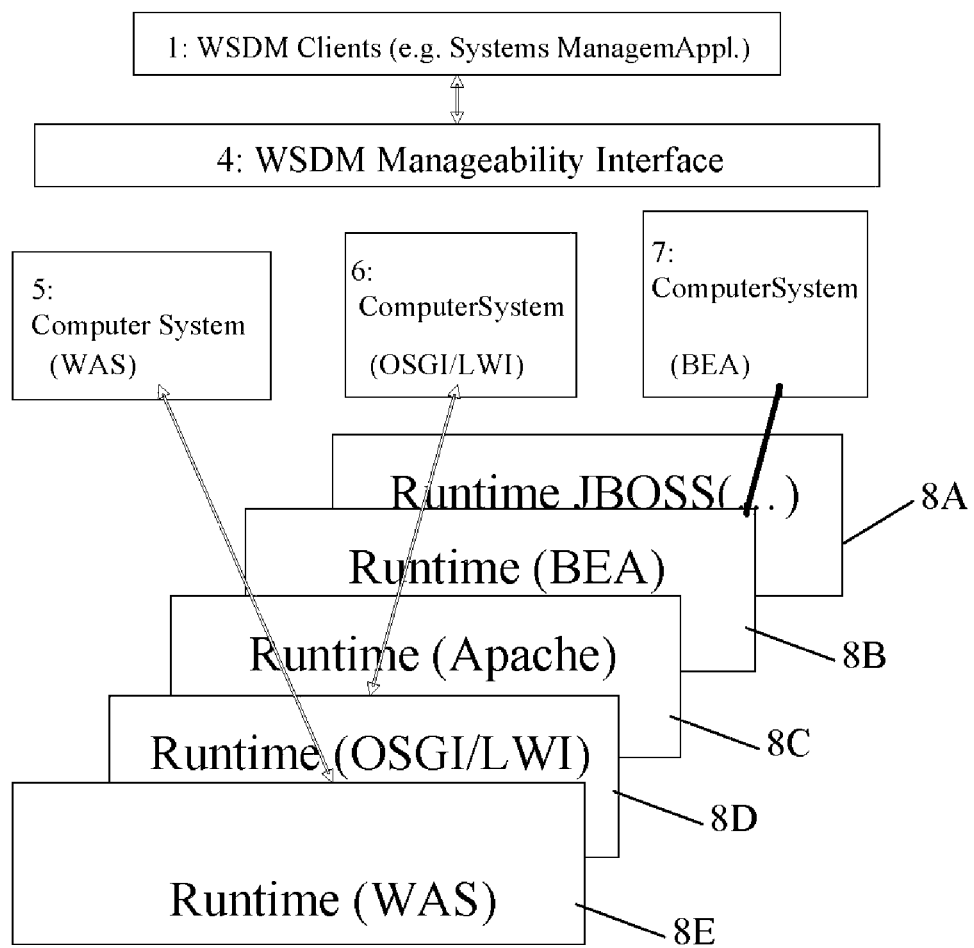
FIG. 1 illustrates the most basic structural components of a prior art hardware and software environment used for a prior art method.
Figure 2:
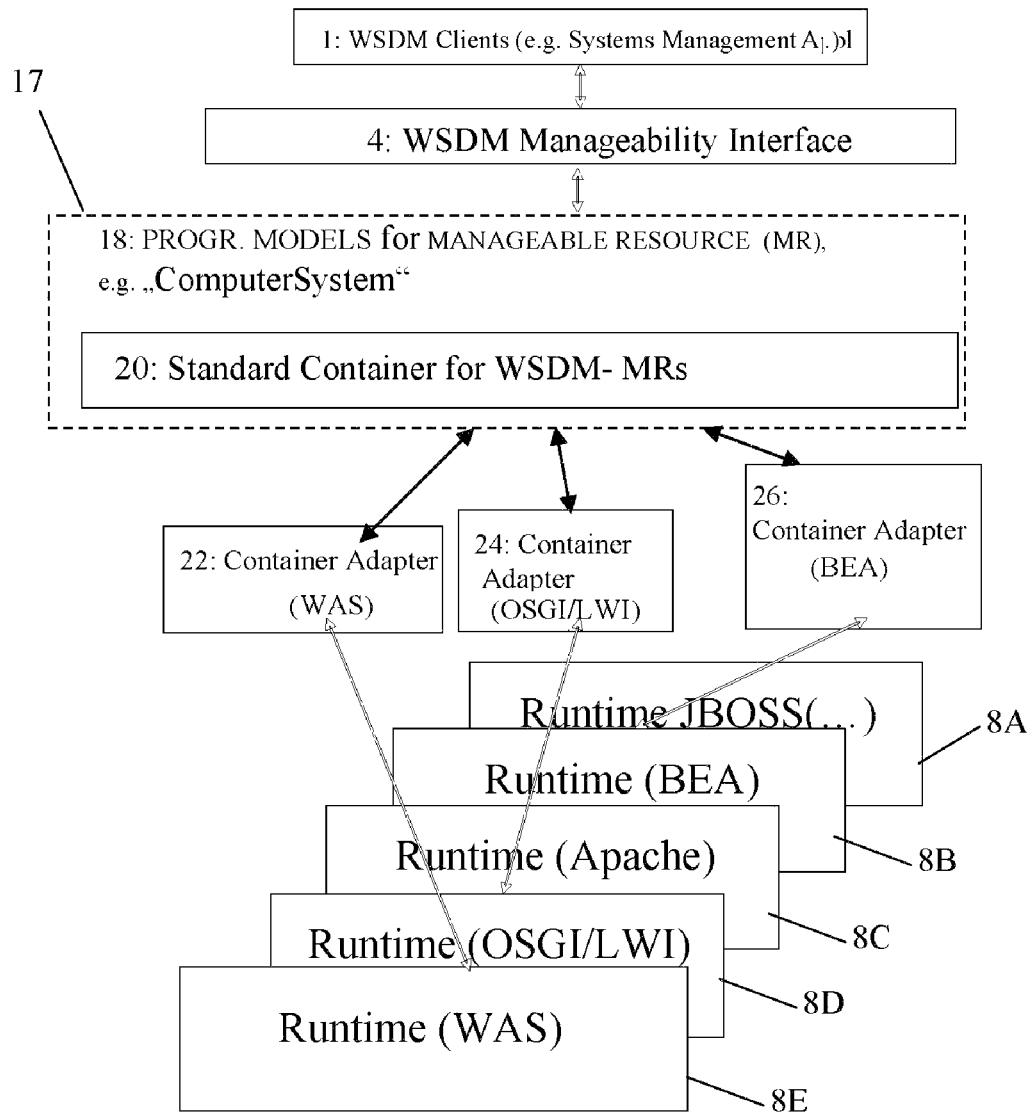
FIG. 2 illustrates a hardware and software environment, according to various embodiments of the invention, including a functional interface layer component, referred to as a "standard container" used for at least one embodiment of the inventional method.

With general reference to the figures and with special reference now to FIG. 2 the inventional method provides an interface layer 17 comprising two components, first, a plurality of generic programming models of all resource types available. The programming model of an exemplarily selected, manageable resource "computer system" is depicted in the drawing. Second, a so-called "standard container" for WSDM-manageable resources 20.

With respect to the first component 18, in addition to the resource type "computer system" depicted in the drawing, a complete plurality of further generic, programming models for any other currently existing resource types is also present in the functional component 18. Thus, this component 18 represents a complete collection of programming models.

These programming models may be generic, i.e., they are drafted so general in nature, that a generic model covers any version, any programmed appearance of a resource independent of its current logical structure and functional scope and behavior. Details hereto and examples are given later below with reference to FIG. 6.

Connected to the standard container 20 via respective application programming interfaces are container adapters 22, 24 and 26 which are all functional components, programmed to connect between the above mentioned standard container and a respective one of different runtime environments 8A . . . 8E.

Figure 3:
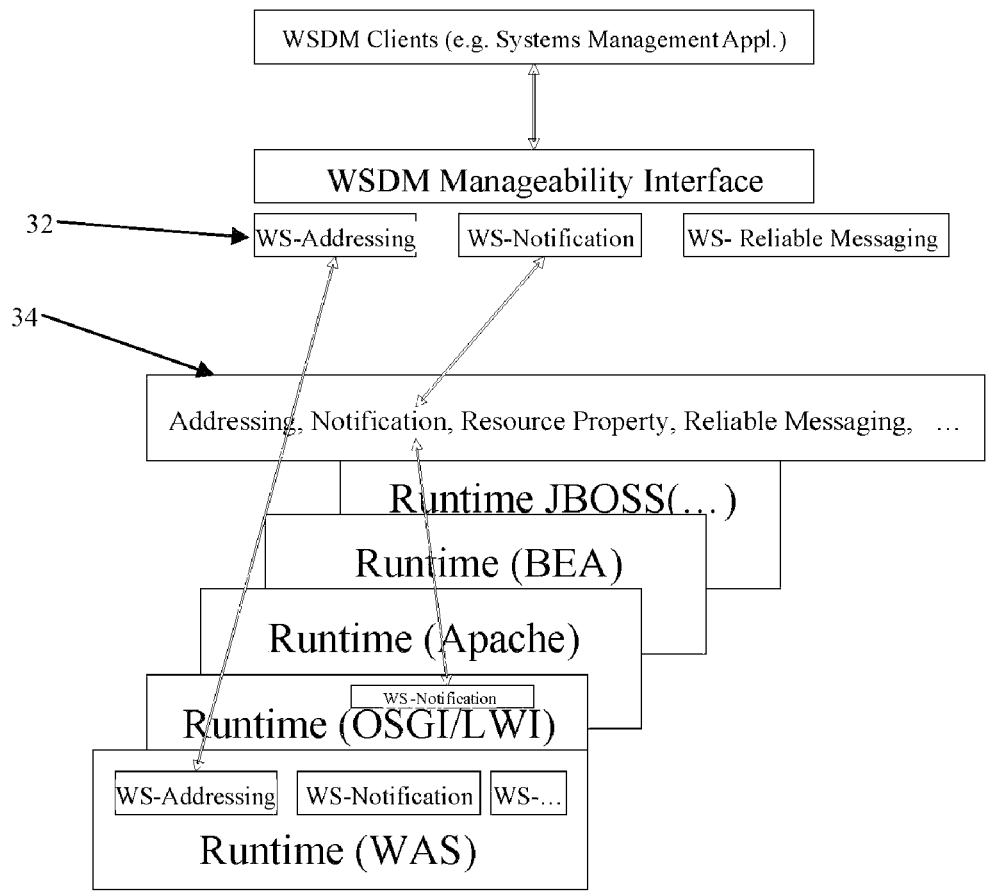
FIG. 3 is schematic depiction according to FIG. 2 in which details of the inventional standard container are shown according to at least one embodiment of the present invention.

FIG. 3 includes exemplarily selected details of the interface layer 17 of FIG. 2. The inventional container 17 adds functionality and quality of service to the WS-standards required for WSDM compliant implementations. In more detail, in FIG. 3 the functionalities: WS-addressing, WS-notification, WS-resource property and WS-reliable messaging are shown in this respect. These components are all denoted by a reference sign 32. From the schematic view of FIG. 3 a person skilled in the art may appreciate that for example the functionality of the WS-addressing stack and the WS-notification stack is added by means of the inventional standard container 20 to the runtime environment WAS, having reference sign 8E. Similarly, the WS-notification stack is added to the runtime environment 8D of OSGI, LWI (Lightweight Infrastructure Runtime), etc. Similarly, other functionalities like resource property and reliable messaging, which are listed in box 34, are added to any one of the depicted runtime environments.

Figure 4:
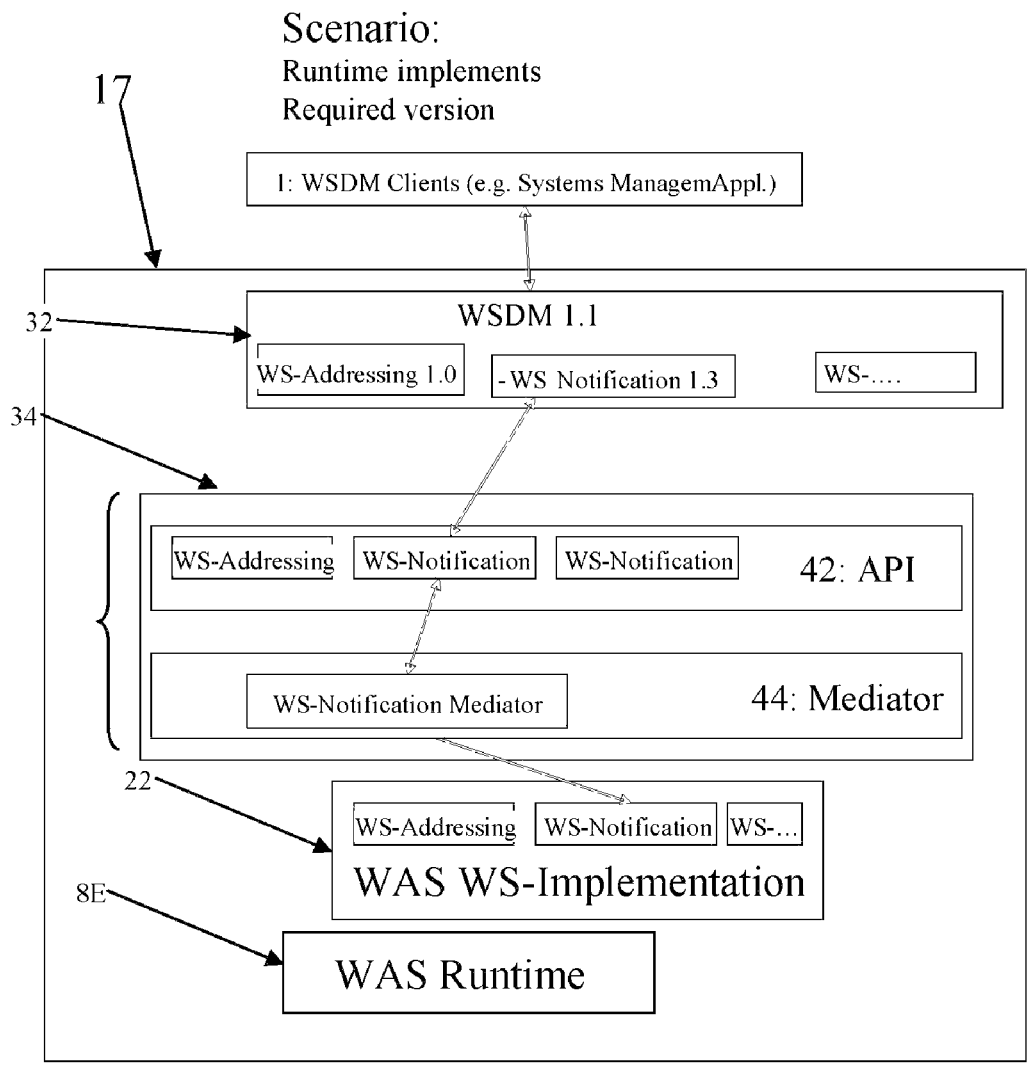
FIG. 4 is a schematic depiction of a zoom view into the standard container of FIG. 3 in which a scenario is shown in which a runtime environment implements a required version of required WSDM web service specifications, according to at least one embodiment of the present invention.

FIG. 4 details the before mentioned inventional functionalities by using a concrete and exemplarily selected use case, in which the runtime environment implements the required version of WS-specification.

In the example of FIG. 4 the inventional Standard Container 17 runs on the same runtime environment as the WS-Implementation 22. This can be deployed on separate runtime environments if needed. The WSDM client interfaces with the WSDM 1.1 standard compliant interfaces. WSDM 1.1 requires specific WS-compliant implementations, herein referred to as WS*-implementations.

The standard container 17 implements an API Layer 42 for these specific WS*-implementations. In this example the WAS runtime environment contains an implementation which implements exactly the required WS-Notification version and hence the Mediator component of the container is just passing through the request from API.

Figure 5:
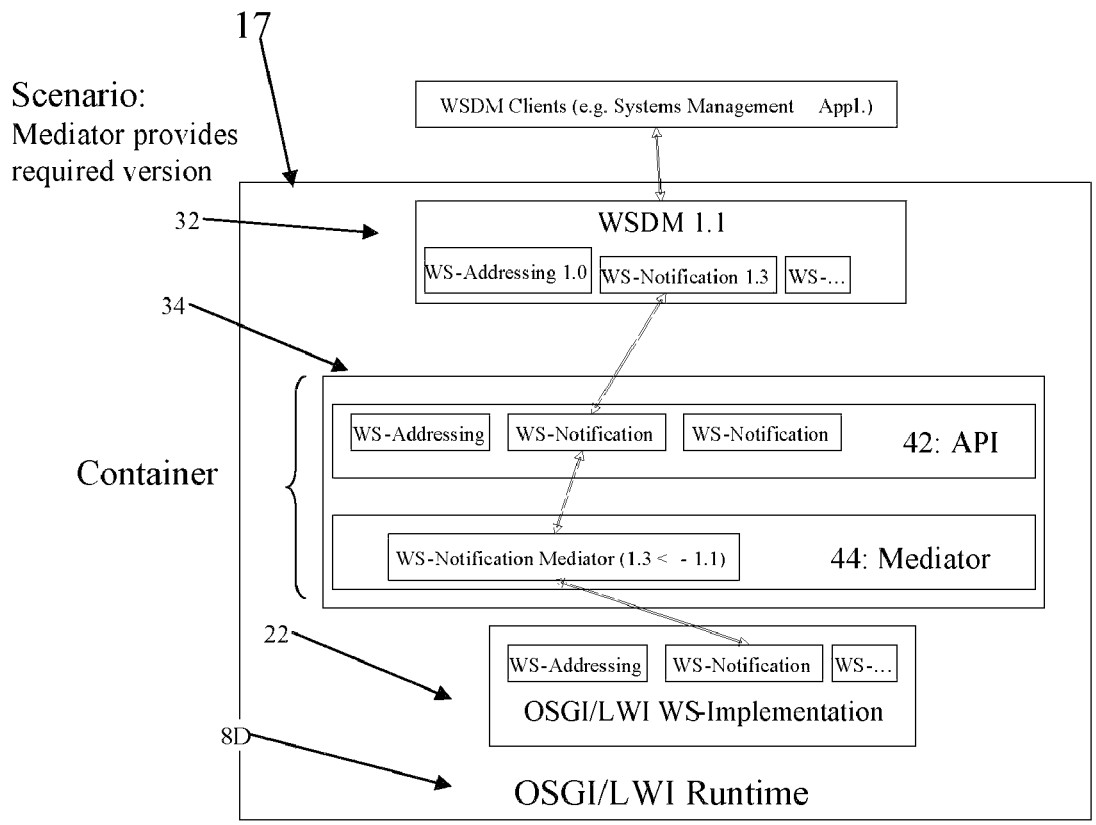
FIG. 5 is a depiction according to FIG. 4 in which a scenario is shown in which a so-called "mediator" provides the required version according to at least one embodiment of the present invention.

With reference to FIG. 5 in the next scenario the Mediator 44 provides the capabilities of the required WS-Notification to the API by mitigating the runtime deficiencies.

Here, the WSDM clients communicate with a WSDM 1.1 compliant implementation deployed on an OSGI/LWI runtime. This runtime environment does not provide the required WS-Notification version 1.3, and hence the Mediator complements the differences between version 1.1 and 1.3.

Figure 6:
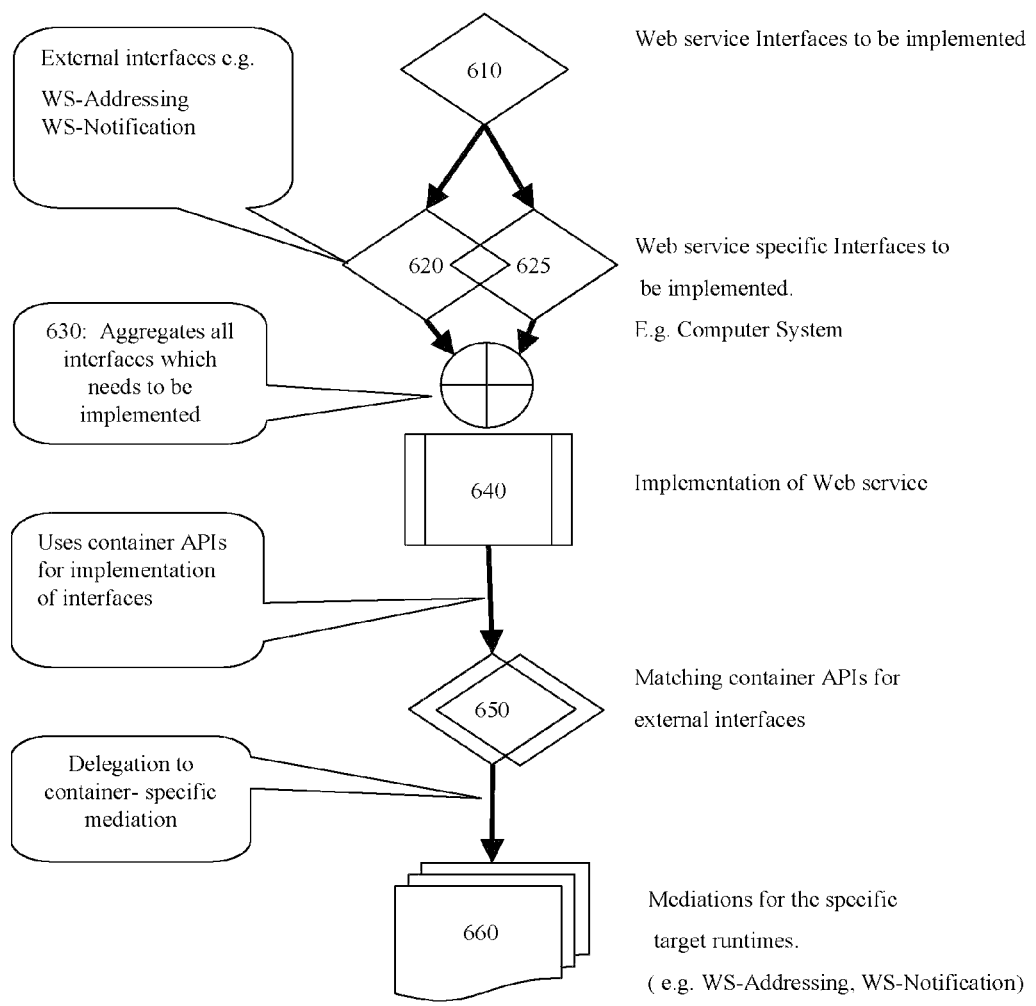
FIG. 6 shows a generic web service, based on the inventional container according to at least one embodiment of the present invention.

Next, and with reference to FIG. 6 the overall control flow is described performed according to a embodiment to build a generic web service, based on the inventional container 20.

The control flow starts with step 610 which represents the sum of all web services interfaces the web service to be built should implement. This is the first design level action which has to be done. No special Know-How is required other than providing a complete collection of interfaces and interface requirements.

Step 620 shows the aggregation of all external, standardized web service interfaces. Examples are the standardized interfaces like WS-Addressing, WS-Notification, etc., i.e., that was has been referred to above as "WS*" relevant.

Step 625 mentions the Web service specific interfaces, or in other words, the deviations to the standards. An example for this interface includes the attributes and methods which define the Web Service specific part of a resource type, such as e.g., the Computer System. Here for example: methods like Install, Start, Stop, and attributes like RunState, ComputerSystemArchitecture, etc., are collected.

Step 630 combines and aggregates the interfaces from step 620 and 625 to form the complete external interface of the web service which should be implemented.

Steps 610 to 630 are runtime and platform independent steps which can be advantageously supported by specific tooling in one of the prior art development environments. Examples are Rational Application Developer, Eclipse Tooling, etc.

In step 640 the runtime and platform dependencies for the implementation of the web service are resolved.

It should be noted that in prior art the developer must decide on which runtime and which platform he wants to implement the web service. More specifically, he needs to use the platform and/or runtime specific interface to do the implementation of the web service. In consequence adapt the diverse platform- and runtime specific requirements is a lot of work as it was discussed in the introductory section.

Instead, by means of the inventional approach the developer is allowed to still stay in the platform and runtime independent "arena" as he uses generalized or generically available interfaces to do the implementation of the web service itself. This adds a major separation of concerns to the development of the web service implementation. For the implementation of Step 640 the developer now uses a set of generic interfaces to express any actual action desired to be implemented.

Examples are:

to send a notification via WS-Notification-style interactions, to retrieve the WS-Addressing context from the SOAP (Simple Object Access Protocol) message, etc. In Step 660 these interface calls will be mediated to the appropriate runtime functions available on the target platform and runtime environment.

This can be implemented in a wide range of programming means beginning with a simple interface-to-parameter mapping ending up to a complete implementation of missing runtime functionality.

In an example for "interface-to-parameter" mapping the service implementation calls the inventional API (container) for example with the SendNotification(Paramaters) operation. An implementation of the mediator pattern as described earlier maps between the container API and the corresponding implementation API of the available runtime stack. Use cases are for example:

for Runtime WAS 6.1: In this case the mediator will map the service implementation call to the operation WS_Notification_Send_Async(Param__1, Param__2).

for Runtime OSGI: In this case the mediator will map the call to for example Apache_Notification_Impl_Send_Async (Param__1, Param__2, Param 3).

In this case the missing functionality not being part of the target runtime environment can either be proprietary implementation of a service provider, or Open Source implementations.

So, the inventional adaptation mechanism provides the missing functionality as "delta information of code" and thus adapts the inventional generic resource programming model to any desirable runtime-specific resource model. Thus, a complete generic API between WSDM clients and diverse runtime environments is built according to the invention.

The advantage of the inventional API thus obtained along steps 610 to 650 is that the user does not need to know nor relies on this "fill-the-interface-gap" implementation. To implement this API solution, prior art technology like "dependency injection", dynamic strategy patterns or annotations are used.

Step 660 illustrates the final implementation of such an API. The implementation is specific for a given runtime/platform combination. These parts could either be statically bound to the web service itself or be dynamically bound during deployment or execution of the Web service.

The invention can take the form of an entirely hardware embodiment, an entirely software embodiment or an embodiment containing both hardware and software elements. In a embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A computer implemented method comprising:
   using a generic resource programming model of a resource defining access modalities required for accessing said resource and defining a specification of functionalities and attributes associated with a resource;
   using an adaptation mechanism comprising a plurality of deltas of code functionality for adapting said generic resource programming model to a respective plurality of runtime-specific resource models comprising respective different resource functionalities and respective different access modalities specific for a respective plurality of said different runtime environments;
   accessing said resource in its specific runtime environment by using a request comprising the respective delta of code functionality specific for the runtime environment of said resource;
   and wherein a plurality of different runtime environments exist and are used by either one of said resources or by a systems management application accessing one of said resources, wherein said different runtime environments require the usage of a web service resource framework comprising a plurality of respective different, runtime-specific web service standards.

2. The method according to claim 1, wherein said resource is selected from a group consisting of:
   a server resource,
   a storage resource, or
   a network resource.

3. The method according to claim 1, wherein a subgroup of said different runtime environments is processed, wherein said runtime environment is selected from a group consisting of:
   IBM Websphere Application Server,
   Apache technology,
   ".net" technology,
   Open Service Gate Way Interface (OSGI)
   JBOSS,
   BEA WebLogic, and,
   any other type of (J2EE) Application server.

4. The method according to claim 1, wherein said adaptation mechanism comprises:
   a generic interface implementing a desired action to be performed at said resource, mediating said interface to an appropriate runtime function within a specific one of said different runtime environments.

5. The method according to claim 4 wherein the mediating is implemented by a interface-to-parameter mapping.

6. The method according to claim 4, wherein the mediating is implemented by programming code for implementing a functionality missing in said generic resource programming model.

7. An electronic data processing system comprising:
   means for storing a generic resource programming model of a resource defining access modalities required for accessing said resource and a specification of functionalities and attributes associated with a resource;
   means for storing a functional component implementing an adaptation mechanism comprising a plurality of deltas of code functionality for adapting said generic resource programming model to a respective plurality of runtime-specific resource models comprising respective different resource functionalities and respective different access modalities specific by means for sending a request comprising the respective delta of code functionality specific for the runtime environment of said resource for accessing said resource in its specific runtime environment for accessing a resource implemented in a computer network, wherein a plurality of different runtime environments exist and are used by either one of said resources or by a systems management application accessing one of said resources, wherein said different runtime environments require the usage of a web service resource framework comprising a plurality of respective different, runtime-specific web service standards.

8. A computer program product for accessing a resource implemented in a computer network, the computer program product comprising:
   a computer readable storage medium having computer readable program code embodied therewith, the computer readable program code configured to:
      use a generic resource programming model of a resource defining access modalities required for accessing said resource and a specification of functionalities and attributes associated with a resource;

use an adaptation mechanism comprising a plurality of deltas of code functionality for adapting said generic resource programming model to a respective plurality of runtime-specific resource models comprising respective different resource functionalities and respective different access modalities specific, accessing said resource in its specific runtime environment by using a request comprising the respective delta of code functionality specific for the runtime environment of said resource;

and wherein a plurality of different runtime environments exist and are used by either one of said resources or by a systems management application accessing one of said resources, wherein said different runtime environments require the usage of a web service resource framework comprising a plurality of respective different, runtime-specific web service standards, comprising a computer useable medium including a computer readable program.

* * * * *